March 8, 1932. A. W. FORSTER 1,848,122
DEVICE FOR USE IN INTRODUCING A FLUID INTO A
CONDUIT FOR FLOWING MATERIALS
Filed Feb. 20, 1930 2 Sheets-Sheet 1
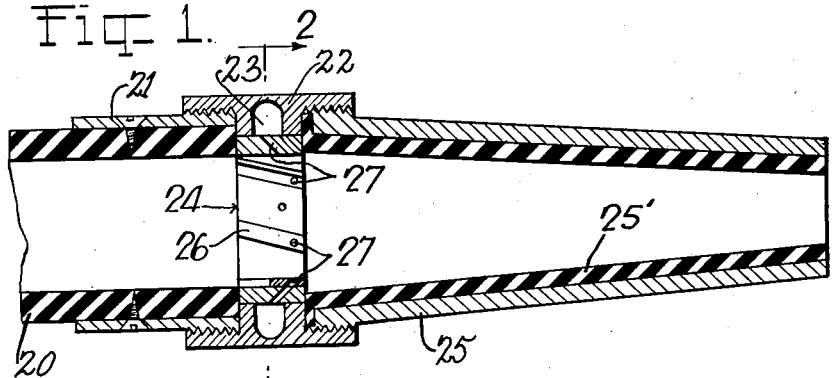
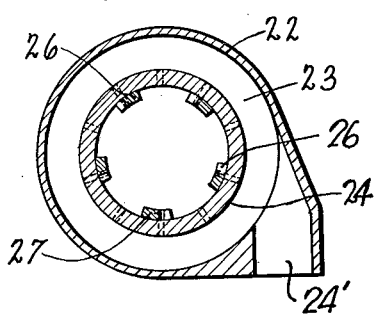
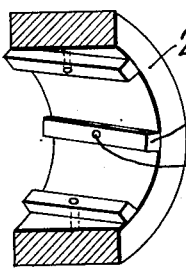
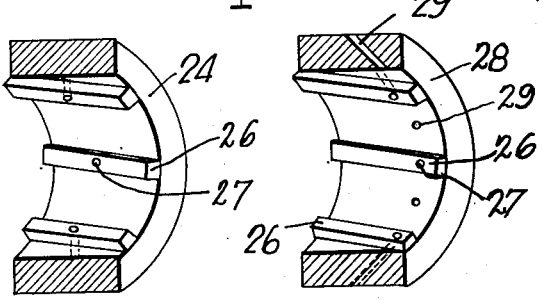
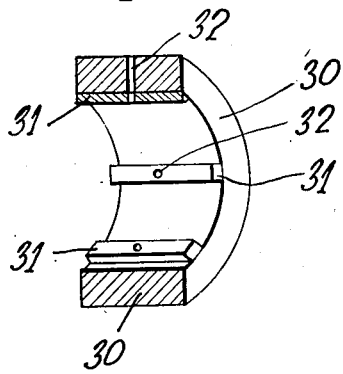
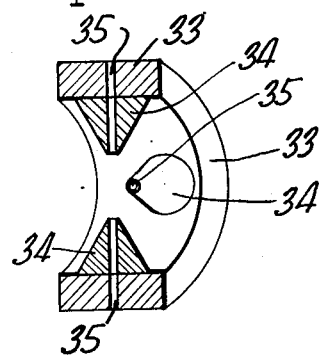
INVENTOR.
Alois W. Forster
BY
J. P. Warfield
ATTORNEY.

March 8, 1932.   A. W. FORSTER   1,848,122
DEVICE FOR USE IN INTRODUCING A FLUID INTO A
CONDUIT FOR FLOWING MATERIALS
Filed Feb. 20, 1930   2 Sheets-Sheet 2

INVENTOR.
Alois W. Forster
BY
J. P. Warfield
ATTORNEY.

Patented Mar. 8, 1932

1,848,122

UNITED STATES PATENT OFFICE

ALOIS W. FORSTER, OF BROOKLYN, NEW YORK

DEVICE FOR USE IN INTRODUCING A FLUID INTO A CONDUIT FOR FLOWING MATERIALS

Application filed February 20, 1930. Serial No. 429,854.

This invention relates to devices for use in introducing a fluid into a conduit for flowing materials, and, in its more particular aspects, to devices in the nature of nozzles for cement guns and the like.

In general, an object of the invention is to provide a device of the character under consideration which is simple in construction, economical of manufacture and assembly, and wherein the thorough admixture of a fluid with materials being forced through a conduit is facilitated.

More particularly an object of the invention is to provide improved means for facilitating the admixture of a fluid with materials forced through a conduit by a suitable means such as a device in the nature of a cement gun.

Another object is to introduce a fluid into flowing materials at such point as will assure the most effective admixture of the materials.

Another object of the invention is to provide improved means for imparting a mixing movement to the material flowing through the conduit of the nozzle of a device in the nature of a cement gun or the like.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Figure 1 is a longitudinal section of a nozzle construction embodying the inventon;

Fig. 2 is a transverse section along the line 2—2 in Fig. 1;

Fig. 3 is a sectional perspective detail view of a portion thereof;

Fig. 4 is a similar view of a portion of a modified form of device embodying the invention;

Figs. 5, 6, 7, 8, 9, 10, 11 and 12 are similar views of like portions of still other devices embodying the invention.

Figure 7:
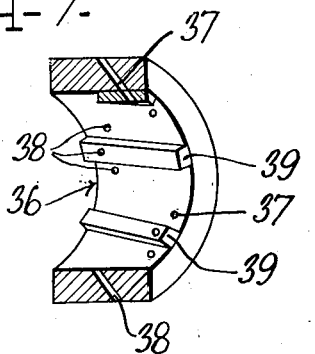

In nozzle constructions of the type employed in connection with cement guns and similar devices, it is customary to connect the hose and the nozzle tip by means of a metallic coupling formed to provide an annular chamber and having means internal of this chamber providing a plurality of channels through which a liquid in the chamber may be introduced into the interior thereof so as to be admixed with the materials flowing through the conduit of the nozzle. Among the limiting factors in the successful and effective operation of cement guns and similar devices, are the requirements of speed of operation and of effectiveness of mixing the introduced liquid with the material flowing through the conduit provided by the nozzle. The present invention contemplates the provision of features of construction, whereby the admixture of the introduced liquid and the flowing material in a nozzle may be more readily effectuated; so as to assure better results and at the same time to permit a more rapid operation.

I have found, for example, that if the liquid is introduced nearer the center of the flow, if the liquid is introduced at points at varying distances from the center of the flow, or if the direction of flow is altered to a certain extent adjacent the point of introduction of the liquid, a more thorough mixing of the materials in proportion to the size of the conduit, the forces applied, and other constant factors, is obtained. These results may be accomplished in various ways in accordance with the invention, certain forms of construction permitting these results being particularly exemplified.

As exemplified all of these forms are adapted to be embodied in the type of nozzle exemplified in Fig. 1; and to be utilized in connection with the mixing of a liquid with one or another of such materials as sand, rock wool, asbestos, ground cork, cotton powder, etc.

The exemplified construction includes a hose 20 through which material is forced toward the tip of the nozzle. This hose carries at its forward end a ring 21 which is formed.

with screw-threads to receive the internal screw-threads at the rear inner end of an annular, ordinarily metallic, member 22. The member 22 is formed to provide an annular chamber 23, the inner wall of which, in the present instance, is formed by a removable metallic annulus 24 which is suitably formed with channels connecting the chamber 23 to the interior of the conduit provided by the annulus; it being understood, of course, that suitable means for introducing liquid to the chamber 23 are provided. One type of inlet is indicated at 24' in Fig. 2. At the forward end of the member 22 a nozzle tip 25 is suitably mounted as by means of screw-threads, a suitable liner 25' being preferably carried in the tip.

It is to be observed that the annulus 24 is so mounted that it can readily be removed and replaced when worn, or when it is found desirable to replace it with a differently constructed annulus, such, for example, as one of the annuli exemplified in Figs. 4 to 12, inclusive, either because the nozzle is to be used for the application of a different type of material to the work, or for other reasons.

In the form of construction shown in Figs. 1, 2 and 3, the annulus 24 is formed on its inner surface with a plurality of internal projections 26, which extend generally in the direction of flow of material through the conduit, but which are inclined somewhat with respect to the axis of the conduit so as to impart a rotary action to the material forced through the conduit to facilitate the mixing of the introduced liquid with the material. By effectuating such a rotary action in the material at this point, a thorough admixture of the liquid with the material before the same is ejected from the tip of the nozzle, is assured. In the present instance, the channels 27 connecting the chamber 23 and the central conduit, extend through the projections 26 and are inclined in the direction of flow of the material, but they may extend radially thereof, if desired.

In Fig. 4 there is exemplified an annulus 28, which is similar to that shown in Fig. 3, except that besides channels 24 extending through the projections 26, there are also provided channels 29 which extend to the inner surface of the annulus itself and insure the introduction of liquid to that part of the material which flows between the projections 26.

In Fig. 5 there is shown an annulus 30 having projections 31 extending parallel to the axis of the conduit and channels 32 extending radially of the annulus.

In order to obtain a particularly deep penetration of the material by the liquid, it is in certain instances desirable to extend the projections inwardly a considerable distance. The annulus 33, exemplified in Fig. 6, shows one such construction, wherein the projections 34 extend more than half the distance between the inner surface of the annulus and its center, and have channels 35 extending the full length of the projection.

For the purpose of assisting the mixing by varying to a maximum extent the forces within the conduit, it is in certain instances desirable to form various channels so that they extend in different angular directions. The annulus 36 in Fig. 7 is exemplified as formed with channels 37 inclined forwardly in the direction of flow of the material and with other channels 38 inclined rearwardly with respect to the flow. The annulus 36, moreover, is formed with projections 39, and certain of the channels 37 and 38 extend through these projections, while others extend merely to the inner surface of the annulus.

Figure 8:
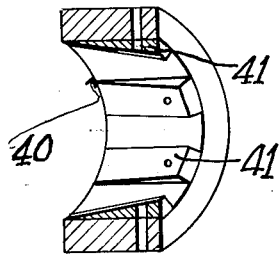

In Fig. 8 there is exemplified an annulus 40 having a form of projection 41, which slopes inwardly in the direction of flow so as to exert a different type of effect upon the flow of the material and to create a particularly effective mixing of the liquid with the material.

Figure 9:
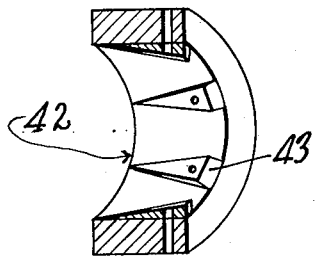

The annulus 42 exemplified in Fig. 9, is formed with projections 43, having side walls which diverge in the direction of flow, as well as an inner wall which is inclined inwardly.

Figure 10:
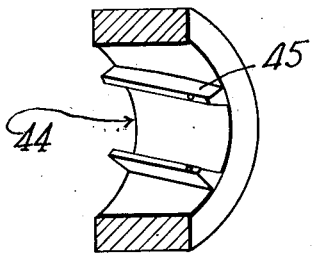
Figure 11:
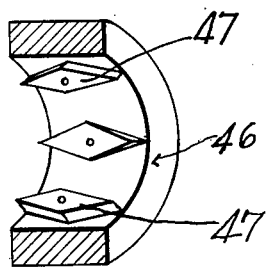

The annulus 44 of Fig. 10 has projections 45 with inwardly converging side walls. The annulus 46 in Fig. 11, has diamond-shaped projections 47.

Figure 12:
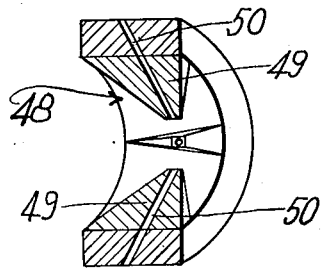

Fig. 12 shows an annulus 48 having projections 49 extending more than half the distance between the inner surface of the annulus and its central axis and formed with side walls which diverge forwardly and converge inwardly, and with an inner wall which slopes inwardly. Forwardly inclined channels 50 extend through these projections.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A device of the character described, comprising a conduit for material, means providing an annular chamber surrounding said conduit, projections extending into said conduit internally of said chamber, and a plurality of channels extending from said chamber through said projections to said conduit.

2. A device of the character described, comprising a conduit for material, means providing an annular chamber surrounding said conduit, projections extending into said conduit internally of said chamber, and a plurality of channels extending from said chamber through said projections to said conduit, said channels extending in a direction oblique to the diameter of said conduit.

3. A device of the character described, comprising a conduit for material, means providing an annular chamber surrounding said conduit, projections extending into said conduit internally of said chamber, and a plurality of channels extending from said chamber through said projections to said conduit, said projections extending in a direction oblique to the axis of said conduit.

4. A device of the character described, comprising a conduit for materials, an annular chamber surrounding said conduit, projections extending into said conduit internally of said chamber, a plurality of channels extending from said chamber through said projections to said conduit, said projections extending in a direction oblique to the axis of said conduit, and said channels extending in a direction oblique to the diameter of said conduit.

5. A device of the character described, comprising a conduit for material, means providing an annular chamber surrounding said conduit, channels connecting said chamber and said conduit, and projections disposed internally of said chamber, said projections extending obliquely to the axis of the conduit.

6. A device of the character described, comprising a conduit for material, means providing an annular chamber surrounding said conduit, channels connecting said chamber and said conduit, and means disposed internally of said chamber to impart a rotary motion to material in said conduit.

7. A device of the character described, comprising a conduit for materials, means providing a chamber disposed externally of said conduit, projections disposed internally of said chamber, and channels connecting said chamber and said conduit.

8. A device of the character described, comprising a conduit for material, means providing a chamber disposed externally of said conduit, projections disposed internally of said chamber, the inner wall of said projections sloping inwardly and forwardly in the direction of flow of material in said conduit, and channels connecting said chamber and said conduit.

9. A device of the character described, comprising a conduit for material, means providing a chamber disposed externally of said conduit, projections disposed internally of said chamber, the side walls of each projection diverging in the direction of flow of the material in said conduit, and channels connecting said chamber and said conduit.

10. A device of the character described, comprising a conduit for material, means providing an annular chamber surrounding said conduit, channels connecting said chamber and said conduit, and projections disposed internally of said chamber, certain of said channels extending through said projections, and other of said channels extending to the interior of said conduit intermediate said projections.

11. A device of the character described, comprising a conduit for material, means providing an annular chamber surrounding said conduit, projections extending into said conduit a distance greater than half the radius of the conduit, and a plurality of channels extending from said chamber to said conduit through said projections.

12. A device of the character described, comprising a conduit for material, a portion of the wall of said conduit being formed by means providing an annular chamber about said conduit and connections between said chamber and the interior of said conduit, said means being formed with internal projections extending in a direction oblique to the axis of said conduit.

13. A device of the character described, comprising a hose member, a tip member, and means interposed between the two for introducing a liquid into the material flowing therethrough, said interposed means comprising a member formed with an internal annular recess and with an external connection thereto, and a removable annulus within said member and adapted to provide the inner wall of a chamber within said recess, said annulus being formed with channels for the introduction of a liquid from said chamber to material flowing through said annulus and being formed with projections extending toward the axis of the annulus.

14. A device of the character described, comprising a hose member, a tip member, and means interposed between the two for introducing a liquid into the material flowing therethrough, said interposed means comprising a member formed with an internal annular recess and with an external connection thereto, and a removable annulus within said member and adapted to provide the inner walls of a chamber within said recess, said annulus being formed with channels for the introduction of a liquid from said chamber to material flowing through said annulus, and being formed with means to deflect particles of material flowing through it.

15. A device of the character described, comprising a hose member, a tip member, and means interposed between the two for introducing a liquid into the material flowing therethrough, said interposed means comprising a member formed with an internal annular recess and with an external connection thereto, and a removable annulus within said member and adapted to provide the inner wall of a chamber within said recess, said annulus being formed with channels for the introduction of a liquid from said chamber to material flowing through said annulus and with projections extending interiorly thereof, the said channels extending through said projections.

16. A device of the character described, comprising a hose member, a tip member, and means interposed between the two for introducing a liquid into the material flowing therethrough, said interposed means comprising a member formed with an internal annular recess and with an external connection thereto, and a removable annulus within said member and adapted to provide the inner walls of a chamber within said recess, said annulus being formed with channels for the introduction of a liquid from said chamber to material flowing through said annulus, and being formed with means to impart a rotary movement to the material flowing therethrough.

17. A device of the character described, comprising a hose member, a tip member, and means interposed between the two for introducing a liquid into the material flowing therethrough, said interposed means comprising a member formed with an internal annular recess and with an external connection thereto, and a removable annulus within said member and adapted to provide the inner wall of a chamber within said recess, said annulus being formed with channels for the introduction of a liquid from said chamber to material flowing through said annulus and with projections extending interiorly thereof, at least a portion of said channels extending through said projections.

18. A device of the character described, comprising an annulus, means to deliver material to one side of the conduit provided by said annulus in a direction axial thereof, means to conduct material away from the other side of said annulus, said annulus being formed with channels for the delivery of a fluid to material flowing therethrough, means provided at the exterior of said annulus for supplying a fluid to said channels, and means on the interior of said annulus for imparting a rotary motion to the material flowing therethrough.

In testimony whereof I affix my signature.

ALOIS W. FORSTER.